Dec. 17, 1963   R. C. SCHROEDER ETAL   3,114,336
SIMPLIFIED FREIGHT BRACING APPARATUS
Filed May 8, 1959   5 Sheets-Sheet 4

INVENTOR.
DAVID D. WOOD
ROBERT C. SCHROEDER
BY
SMITH, WILSON, LEWIS & McRAE

Dec. 17, 1963   R. C. SCHROEDER ETAL   3,114,336
SIMPLIFIED FREIGHT BRACING APPARATUS
Filed May 8, 1959   5 Sheets-Sheet 5

INVENTOR.
DAVID D. WOOD
ROBERT C. SCHROEDER
BY
SMITH, WILSON, LEWIS & McRAE

United States Patent Office 3,114,336
Patented Dec. 17, 1963

3,114,336
SIMPLIFIED FREIGHT BRACING APPARATUS
Robert C. Schroeder, Dearborn, and David D. Wood, Plymouth, Mich., assignors to Sparton Corporation, Jackson, Mich., a corporation of Ohio
Filed May 8, 1959, Ser. No. 811,988
6 Claims. (Cl. 105—369)

This invention relates to freight bracing apparatus for supporting articles of freight against horizontal and vertical shifting. The invention has application in stationary storage areas, i.e. warehouses, stockrooms, and supply rooms, but the invention has certain features of construction and design which enable it to be utilized particularly in storage areas subjected to external inertia forces, as for example, storage areas in ships, freight cars, automotive trailers, and cargo type airplanes.

In the storage of freight within movable vehicles (such as freight cars or automotive trailers) there may be considerable stop-and-go movement which subjects the freight bracing apparatus to considerable stress. For example, it is common in the switching of freight cars in freight yards to send or "hump" loaded freight cars down sloping track areas to automatically make connection with cars in a line. In this manner a complete train is assembled. During this "humping" operation the loaded freight car acquires considerable momentum so that when it is brought to a sudden stop against its neighboring car there is set up a considerable force tending to bow out the car side walls.

The freight bracing apparatus conventionally includes a series of cross members extending between the freight car side walls, and the cross members should be equipped with side wall attachment means which are not easily disengaged or pulled out from the side walls during this humping operation. At the same time the cross members should be of such construction as to permit their being readily disengaged from the car side walls during unloading and loading of the freight car.

In the loading of a complete freight car the number of cross members will vary with the type of cargo, i.e. the size, configuration, weight, and fragileness of the various articles of freight being shipped. However, in a usual freight car installation there may be employed approximately one hundred cross members. Each of these cross-members must be individually placed within the freight car and locked in a desired freight bracing position. Since it is desirable that each freight car be loaded and unloaded as quickly as possible it is advantageous to employ a cross-member construction which can be quickly positioned in a desired freight bracing position by unskilled workmen. A freight bracing cross-member should therefore have the desirable characteristics of low cost, rugged construction, anti-pullout end fitting mechanisms, and quick detachability and installation in the storage area.

A freight car or other travelling storage area may be called on to handle various different size items of freight within the same car. For example, it is common for a single freight car to handle such items of cargo as barrels of oil or chemicals, rolls of paper or the like, cartons containing such fragile material as television sets or the like, and automotive fenders or panels. These different articles of freight require a considerable adjustability of the cross members relative to one another and to the freight, both vertically and horizontally.

In the past several methods have been employed in attempts to achieve the necessary cross-member adjustment required to accommodate the cross-members to differently charactered articles of freight. However, in general the methods employed have either been too costly or have not achieved the required adjustability.

It will be recalled that a usual car installation may require perhaps one hundred or more cross-members, and that the freight cars must be loaded in as short a time as possible. It will be appreciated that conversion of a car to accommodate adjustment of the cross-members to different locations should be carried out in a fairly short period of time so as not to interfere with quick loading and unloading of the freight. Therefore, under the present invention it is proposed to provide each car with a series of horizontal rails removably extending along opposite side walls of the car, said rails being of relatively short length, such as five feet, and each rail being adjustable vertically up and down along the car wall, the construction of each rail being such that it can quickly be locked in a rigid, anchored position on the car side wall in any position of vertical adjustment. Each of the rails is provided with a series of openings therealong, and individual cross-members are provided with end fittings having portions adapted to lockingly engage in the rail openings, the arrangement being such that the cross-members can be adjusted horizontally along the rails. Since the rails can be adjusted vertically on the freight storage area walls, there is thus provided a system of support wherein the cross members can be effectively adjusted in both vertical and horizontal directions.

The rails are so designed as to permit their quick adjustment up and down the storage area walls so that the entire freight loading operation can be carried out very quickly. At the same time, since the rails occupy only a fractional portion of the storage wall area the total cost of the car installation is materially reduced over that which has been found necessary in many prior art constructions. This is particularly true as regards comparison with those prior art constructions wherein the entire side wall of the car is formed by a series of perforated steel sheets, said steel sheets being permanently affixed in the car and being relatively expensive, while contributing a great deal of excess weight to the car.

Some articles of freight are of such character as not to be readily accommodated by the conventional cross-member constructions, such articles being most feasibly carried within special containers removably locked in braced positions within the car after loading. These special containers must of course be braced within the freight car so as not to shift back and forth or be displaced vertically to injure adjacent freight or their own contents. Therefore, it is desirable that a carloading apparatus be of such character as to accommodate these special containers with minimum modification or additional parts requirement. This is particularly true since in many cases there are not enough special containers in a given shipment to occupy a complete car. In these cases the remainder of the car should be loaded with other articles of freight, and the car construction should therefore be of such character as to accommodate the conventional articles of freight as well as and concurrently with accommodation of the special containers.

With the above discussion in mind, it is principal object of the invention to provide a freight-handling apparatus wherein the component parts are of rugged low cost construction while having features of interchangeability and adjustability to adapt the apparatus to full utilization of the available storage space for accommodation of various different articles of freight.

Another object of the invention is to provide a freight-handling apparatus which can be quickly loaded by relatively unskilled personnel.

Another object of the invention is to provide a freight-handling apparatus which can be adjusted or reconstituted to handle various different articles of freight in a very short period of time without tools or other apparatus.

A further object of the invention is to provide a freight bracing apparatus wherein the loading and unloading operations can be accomplished by a very few people, thereby avoiding extensive labor costs in the loading and unloading operations.

A more particular object of the invention is to provide a freight bracing cross member construction wherein the end fittings thereof are of such design as to have a secure locking action on fixed wall structures while being easily operated to move their latches to retracted positions for removal from the wall structures when desired, the design being such as to provide a jam-free operation which eliminates the need for hammering or forcing of the latches or cross members during the loading or unloading operations, particularly in the situations where the cross-members have a relatively tight fit with relation to the cargo.

A further object of the invention is to provide a freight handling apparatus comprising a plurality of cross members removably locked between opposed walls of a freight storage area, the arrangement being such that each of the various cross members can be easily repositioned at different selected locations by a single workman.

A further object is to provide a cross member which can be easily unlatched from an elevated latched position by a simple tilting operation about one of its ends, the arrangement being such as to enable a single workman to do the work formerly performed by two workmen stationed at opposite ends of a cross member.

A more particular object is to provide a freight bracing cross member which can be removed from elevated locked positions by a single workman, the removal operation being performed by unlatching one end of the cross member and tilting it downwardly about its opposite latched end until said latched end automatically works out of its locked engagement with the adjacent support structure. The relationship of parts is such as to provide secure rigid locking of the cross member in operative positions while permitting quick removal and relocation of the cross member when necessary.

An additional object is to provide a cross member which can be easily installed at elevated locations between opposed support structures by merely hooking one end of the cross member over one of the support structures and raising the opposite end of the cross member into position for locking on the opposed support structure.

A further specific object of the invention is the provision of a cross member-support structure arrangement wherein the cross member may be unlatched and removed without longitudinal movement. The desired arrangement is particularly advantageous when the cross member is required to tightly engage such articles of freight as might be scratched, torn, deformed or otherwise injured by longitudinal cross member movement.

A further object of the invention is to provide a freight handling apparatus wherein adjustable rails are provided, said rails having movable latch devices at each of their ends for retention of the rails on the car side walls, the construction of the latches and their arrangement on the rails being such that a single workman can hold a given rail in position along the car side wall and simultaneously actuate the latches to the unlatched positions, thereby enabling one workman to accomplish the same operation as would normally require two workmen in some prior art constructions.

A further object is to provide an arrangement of vertically adjustable rails positionable along freight car side walls and cooperating cross members extending between opposed rails for releasable bracing of freight, the construction of the rails and cross-members being such as to provide vertical and horizontal adjustment of the cross-members while maintaining rigid, high strength connection between the car side walls, rails, and cross members.

A further object of the invention is to provide an apparatus of the above-identified character, wherein the component parts are specifically designed for individual manufacture as low cost, lightweight structures in such manner as to substantially reduce the quantities of materials and weight thereof required as compared with corresponding prior art constructions.

An additional object of the invention is to provide freight bracing apparatus, including pillar structures, horizontal rail structure, and cross-member structures, wherein a minimum number of welding operations are required in parts formation.

A further object is to provide high strength freight bracing apparatus susceptible to formation by low cost forging operations.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
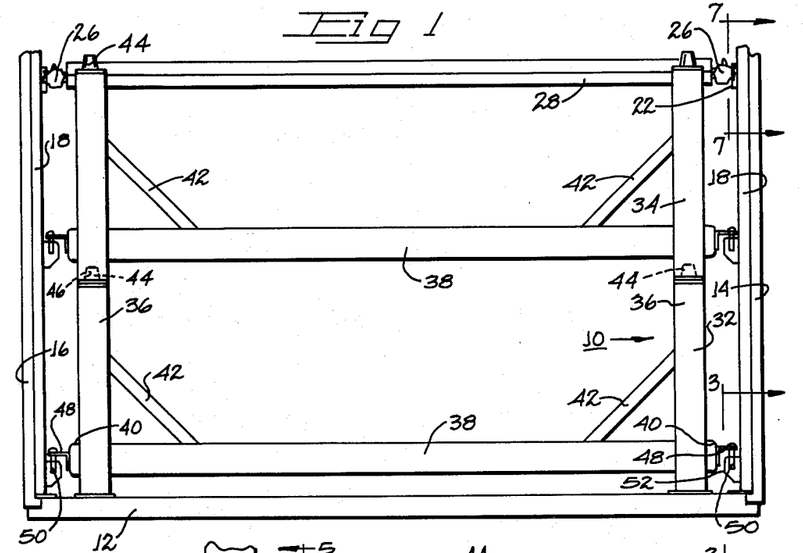
FIG. 1 is a view taken laterally through the lower portion of a conventional freight car, said car being equipped with freight bracing apparatus constituting one embodiment of the present invention.
Figure 2:
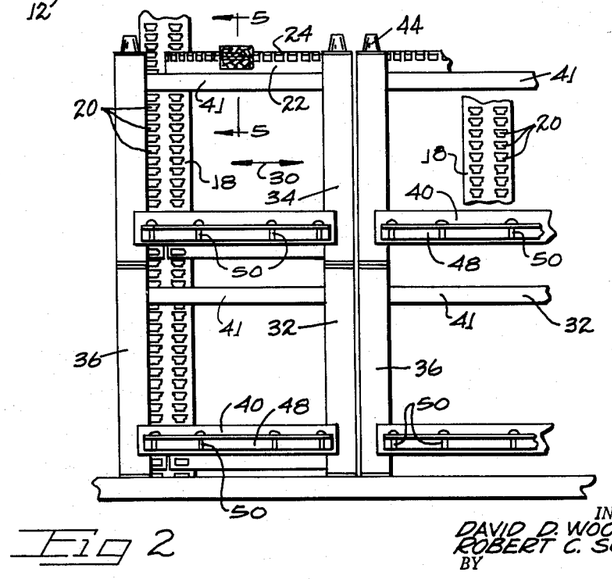
FIG. 2 is a side elevational view of the FIG. 1 apparatus (i.e. taken at right angles to FIG. 1).

Referring to the drawings and particularly FIGS. 1 and 2, there is shown the lower portion of a freight car 10 having floor 12 and opposed side walls 14 and 16. Each of the opposed side walls is provided with a plurality of channel cross sectioned pillars 18 spaced at periodic distances along the length of the car as shown in FIG. 2. Each of the pillars 18 is preferably formed as a rigid immovable structure securely locked on and forming an integral part of the freight car side wall. Each of the pillars is provided with two rows of vertical openings 20 as shown in FIG. 2, the openings being spaced relatively close together in each row for accommodating anchoring portions located on opposite end portions of rails 22, the length of rails 22 and the spacing between pillars 18 being preferably such that a single workman can actuate latching devices located at opposite ends of each rail to install the rails in their vertically adjusted positions on the freight car side wall. Each of the rails 22 is provided with a series of openings 24 for accommodating the projecting end portions of end fittings 26 (FIG. 1) carried by cross members 28.

Each of the end fittings 26 is provided with a latching mechanism for enabling it to be withdrawn from the selected opening 24 so as to permit horizontal adjustment of cross member 28 in the arrow 30 direction. Since the supporting rails 22 are releasably mounted for adjustment on the pillars 18, it will be seen that by adjustment of the rails 22 and cross member 28 the cross member may be effectively adjusted both vertically and horizontally into substantially any desired position within the freight car. It will be understood that preferably the entire length of the freight car side walls are equipped with the pillars 18 and that suitable numbers of the rails 22 and cross members 28 may be provided to completely handle freight within all areas of the freight car.

The cross members 28 may in some instances directly engage the freight or in other instances engage conventional deckboards and bulkheads (not shown), said deckboards and bulkheads being merely slat-like structures which distribute the load onto the various cross members. In a given situation one or more cross members may be utilized to support the deckboards and bulkheads, the number and position of the cross members being determined by the weight and size of the freight. In some instances two or more cross members may be positioned directly behind and alongside one another to provide a cross member combination having an effective strength double that of the single cross member.

It will be noted that in the FIG. 1 construction there are provided a pair of superimposed container structures 32 and 34, each of substantially rectangular configuration. Each of the containers comprises four post members 36 interconnected adjacent their lower ends by means of a floor structure 38 and channel shaped end members 40. The upper ends of adjacent posts 36 may be rigidly interconnected by means of bar elements 41, and the posts braced with respect to floor structure 38 by means of diagonal braces 42.

The container structures may be varied in design and manufacture in accordance with the type of cargo being carried therein. In general the containers are utilized to support articles in a stacked formation, such articles for example as automotive fenders and body panels and other stackable parts which cannot feasibly be carried in "loose" fashion within the freight car storage area. In the usual case the freight containers are loaded prior to their being set into the freight car, the loading operation being such that the loaded containers are conveyed into the freight car by lift truck or other means and stacked or superimposed one on the other as shown in FIGS. 1 and 2. To facilitate the loading of the containers onto one another and the aligning of each container in a correct, non-shiftable position with respect to its adjacent container, each of the container posts 36 may be provided with an upwardly tapering pin 44 on its upper end for telescopingly receiving a socket structure 46 formed in the lower end portion of the adjacent post on the superjacent container. To further prevent shifting of the containers, each of the containers may be equipped with angular cross sectioned bars 48 having downwardly extending pins 50 rigidly carried thereon. When the freight containers are correctly deposited in the freight car the pin portions 50 extend through openings 168 (FIG. 4) formed in the upper wall areas of rails 52, said rails having portions thereon for releasably anchoring them on the pillars 18 in a manner similar to the anchoring of previously mentioned rails 22. It will be understood that rails 52 are installed in the freight car at desired positions along the freight car side walls before depositing of the loaded container 32 or 34. Thus, when the loaded container is deposited in the freight car its pin portions 50 extend automatically through the spaced openings in rails 52 so as to prevent the container from shifting horizontally, either laterally of the car or longitudinally thereof.

It will be appreciated that the number of containers 32 or 34 may be varied in accordance with loading requirements, and that the containers may be positioned alongside one another as shown at 32, 32 in FIG. 2 and/or above one another as shown at 32, 34 in FIGS. 1 and 2. If desired the containers may be stacked on one another to the ceiling of the freight car. Preferably the uppermost container in the series is held down against vertical displacement by means of one or more of the cross members 28 shown in FIGS. 1 and 2, said cross members being installed at the desired position of vertical and horizontal adjustment after loading of the containers into their positions in the freight car.

Figures 3, 5, 6:
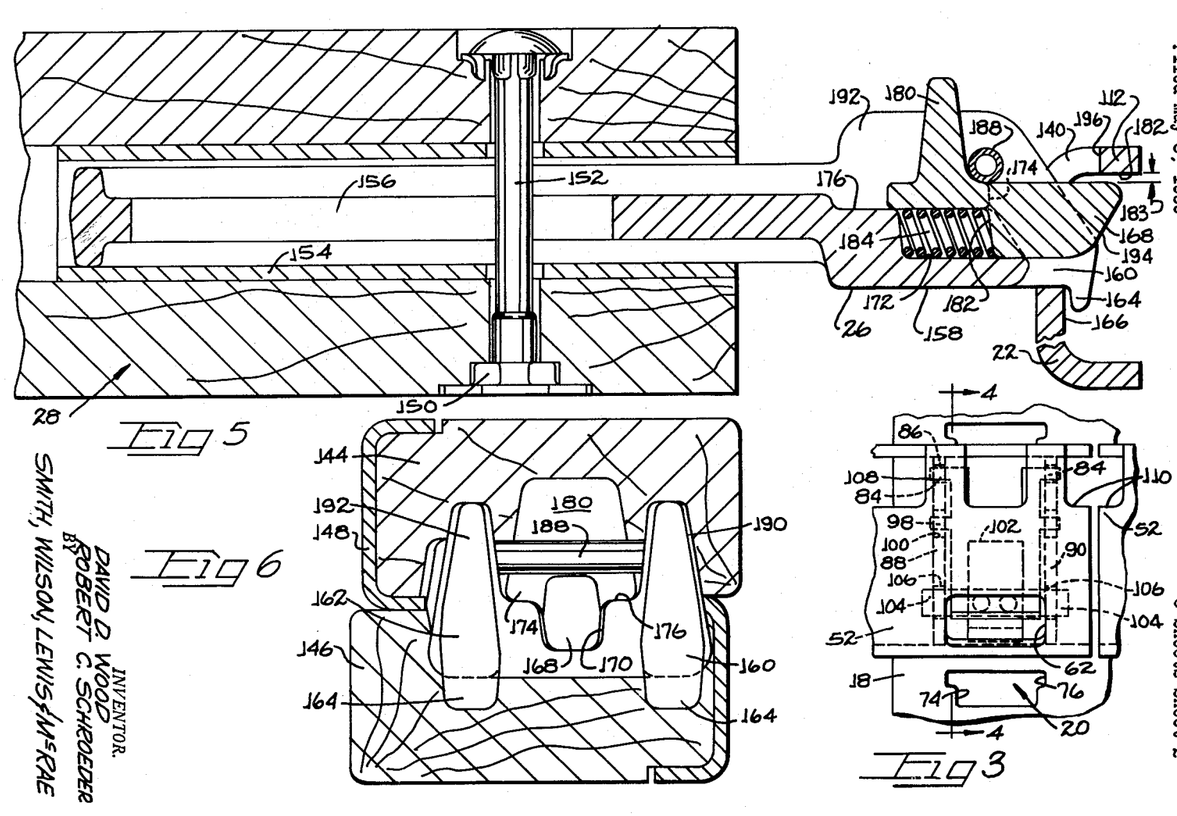
FIG. 3 is an enlarged view taken on line 3—3 in FIG. 1, but with portions of a freight container removed for illustration purposes.
FIG. 5 is an enlarged sectional view taken on line 5—5 in FIG. 2.
FIG. 6 is a right-end elevational view of the structure shown in FIG. 5, but with the supporting rail structure removed for illustration purposes.
Figures 4, 8, 9:
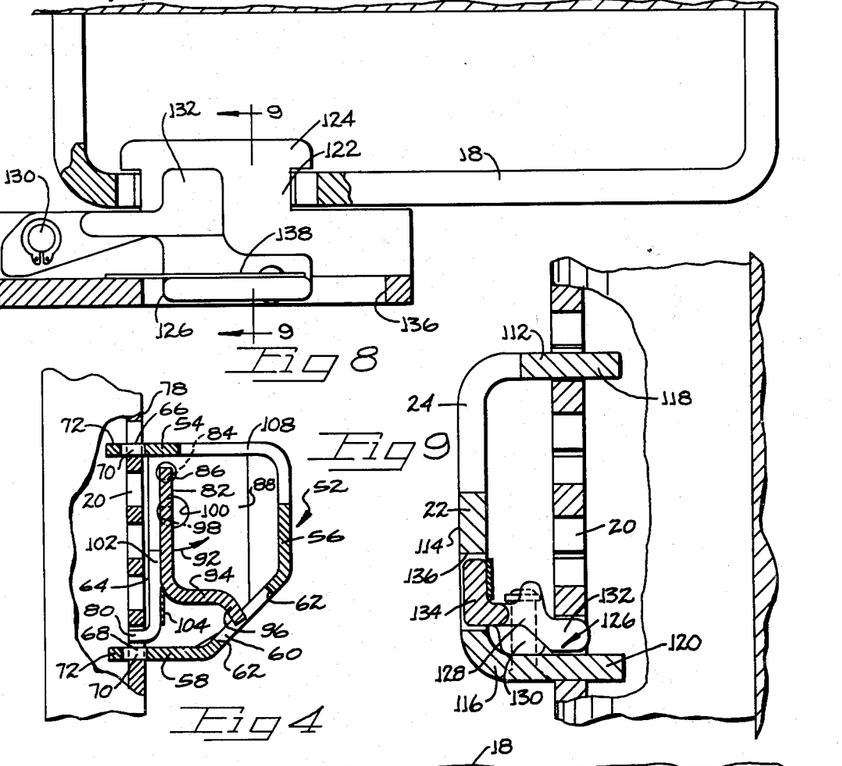
FIG. 4 is a sectional view taken substantially on line 4—4 in FIG. 3.
FIG. 8 is a sectional view taken substantially on line 8—8 in FIG. 7.
FIG. 9 is a sectional view taken on line 9—9 in FIG. 8.

Referring to FIGS. 3 and 4, each of the rails 52 is provided at its opposite ends with anchoring mechanisms for locking the rail in vertically adjusted positions extending across two pillars 18. The spacing between the pillars may be something in the neighborhood of five feet which permits a single workman to grasp opposite end portions of an individual rail 52 for adjusting the rail to a desired position. Each of the rails includes a top wall 54, a front or side wall 56, and a bottom wall 58 joined to side wall 56 by upwardly angled wall 60, said wall 60 having an opening 62 adjacent each end of the rail for allowing the workman to operate the latch structures 64. In order to support rail 52 on the pillars 18 the upper and lower walls 54 and 58 are provided with extensions 66 and 68 adjacent opposite ends of the the rail. Each of the extensions includes a relatively narrow neck portion 70 and a relatively wide head portion 72, the width of portion 70 being preferably slightly less than the width of the lower portion 74 of opening 20, and the width of head portion 72 being slightly less than the width of enlarged upper portion 76 of opening 20. With this arrangement the rail 52 can be installed across two pillars 18 by positioning it horizontally, moving it toward the rails 18 to cause the extensions 66 and 68 to pass through the upper enlarged portions 76 of selected openings 20, and dropping the rail 52 to allow the narrow neck portions 70 to seat within reduced opening portions 74, with the enlarged head portions 72 locating adjacent the rear concealed surfaces 78 of the pillars 18. Removal of the rail 52 is effected by a reverse operation, i.e. lifting bar 52 upwardly and withdrawing it horizontally to cause the extensions 66 and 68 to pass through the enlarged opening portions 76.

During transit it is not desired that rails 52 be subject to vertical displacement. Accordingly there is provided a latch structure 64 adjacent each end of each rail, each latch structure including a portion 80 projectable into the enlarged portion 76 of a selected opening 20 to prevent vertical shifting of the rail. Each latch 64 includes a plate portion 82 having a pair of laterally projecting extensions 84 extending through openings 86 in plates 88 and 90, said plates being suitably fixed in the end portion of rail 52 by welding operations or the like. Extensions 84 are freely seated in openings 86 to constitute fulcrum elements for allowing plate 82 to be moved in the arrow 92 direction. The lower end portion of plate 82 is turned horizontally at 94 and then downwardly at 96 to form a handle structure for allowing a workman to insert his fingers through opening 62 to operate the latch. Pivotal movement of the latch structure in the arrow 92 direction is limited by two lugs 98 formed integrally with plate 82 and extending through enlarged openings 100 in the two plates 88 and 90, said openings 100 being of sufficient diameter to allow the latch to be pivoted around the axis of extensions 84 for a sufficient distance to withdraw portions 80 from the openings 20.

The latch structure may be formed with any desired number of component parts, but as illustrated the latch structure is formed as a two piece member, i.e. member 82 and a second member 102 welded or otherwise secured to member 82 and rigid therewith. In order to secure the latch structure in latched position the member 102 carries a leaf spring 104 which has its opposition end portions extended through notches 106 in plates 88 and 90, the action being such that when latch handle portion 96 is manually actuated to draw the latch in the arrow 92 direction the leaf spring is moved to set up a stress therein for automatically urging the latch in the reverse direction as soon as the manual force on handle portion 96 is released. In this manner the rail 52 is securely locked in adjusted position across the pillars 18 during transit. It will be noted however that the rail may be easily adjusted vertically by a single workman extending his fingers through the openings 62 and grasping the latch handle 96 for automatically withdrawing the latch portion 80. The workman with a single motion is then enabled to lift the rail 52 upwardly and outwardly, and to then reposition the rail at any desired height across the pillars. During insertion of the rail into an adjusted position, when extensions 66 and 68 are aligned with the desired enlarged opening portions 76 the latch portions 80 are automatically aligned with outer surface portions of the pillars, and each latch portion is thereby prevented from interfering with movement of the extensions 66 and 68 into the openings 20. In this connection it will be noted that latch portions 80 terminate outwardly of head portions 72 so that the head portions can enter through openings 20 before portions 80. It will thus be seen that the rail 52 may be easily and quickly relocated from one position to another extending across the pillars 18 so as to materially shorten the time required for loading and unloading a freight car.

As will be apparent from FIGS. 1 and 2 the rails 52, when installed at desired selected positions in the freight car serve to prevent the material containers 32 and 34 from shifting horizontally during transit. Thus the rails 52 are provided with regularly spaced openings 108 in their upper wall areas, said openings serving to accommodate the pin portions 50 carried by the material containers for preventing horizontal shifting. The material containers may in any given installation have to be positioned at various different locations along the length of the freight car so as to fully utilize the available storage area and accommodate different articles of freight. Therefore it is desirable that the rails 52 present a continuous succession of openings 108 along all or a portion of the freight car side wall. In the illustrated embodiment the construction of pillars 18 and the manner of mounting rails 52 thereon is such as to provide a continuous, unbroken succession of openings 108. Thus, each pillars 18 is provided with two rows of openings 20 for accommodating the end portions of two rails 52 in close, unbroken adjacency, the rails being provided at their extremities with openings 110 of one half the dimension of the openings 108, the adjacent openings 110 co- operating together to define an opening similar to the other openings 108 so as to maintain the continuous, unbroken succession of openings for full utilization of the freight car space.

As previously outlined, the freight car is provided with additional rails 22 for anchoring the ends of cross members 28, said cross members being utilized as hold-down devices for the material containers 32 and 34, and as freight bracing devices, either by themselves or in combination with conventional deckboards and/or bulkheads. Each of the rails 22 is of channel shape configuration as shown in FIG. 9, the arrangement being such as to provide an upper wall 112, a front or side wall 114, and a lower wall 116. The upper and lower walls 112 and 116 are provided with integral extensions 118 and 120, each extension including a relatively narrow neck portion 122 and an enlarged head portion 124. The spacing between channel walls 112 and 116 bears a predetermined relation with respect to the spacing of openings 20 in pillars 18, so that the rails 22 can be inserted into anchored positions extending between the pillars in the same manner as the rails 52. To latch each rail 22 in position against vertical displacement in transit, there is provided a latch structure 126, said latch structure including a single one piece forged element 128 pivotally mounted on a fixed pin 130 for swinging movement in a horizontal plane. Member 128 is provided with an end portion 132 which is adapted to extend into a selected opening 20 to prevent vertical displacement of rail 22. Withdrawal of the latch out of opening 20 is accomplished by manually pulling handle portion 134, said handle portion being accessible through an opening 136 formed in the front wall 114 of the rail. When manual pulling pressure on handle 134 is discontinued a leaf spirng 138 becomes effective to automatically return the latch structure to its illustrated latched position. In this manner the rails 22 may be quickly and easily adjusted vertically on the pillars 18.

Figure 7:
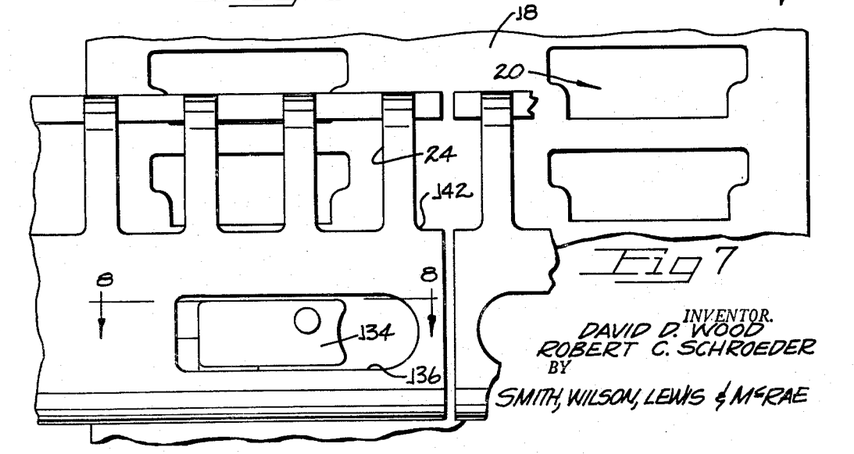
FIG. 7 is an enlarged view taken on line 7—7 in FIG. 1.

It will be appreciated that each end of each rail is provided with a latching and anchoring mechanism as shown in FIGS. 7 through 9. The latching arrangement for rail 22 is somewhat different than the latching arrangement for rail 52, but the rail 22 latch retains the "one handed operation" features that characterize the latch structure for rail 52. Thus, in installing and removing the rail 22 the operator need merely insert his fingers through the openings 136 and pull outwardly against the rear face of the handle structure 134. When the latch portion 132 is withdrawn from its opening 20 the operator can exert a lifting force on the rail 22 without changing the position of his hands. In this manner the rail 22 repositioning operation is effected quickly and easily by a single workman.

As in the case of the rails 52 the rails 22 are provided with a series of openings 140 in their upper wall areas, said openings being regularly spaced along the entire length of the rail, and the extreme end portion of the rail being provided with a "half opening" 142, said opening 142 cooperating with a similar opening in the extremity of the adjacent rail to continue the succession of openings provided by openings 140. In this manner the cross members 28 may be accommodated at points along the entire storage area side wall so as to fully utilize the storage area for freight-bracing purposes.

Referring to FIGS. 5 and 6, each of the cross members 28 is formed by two wooden beam members 144 and 146 carried on an enlongated S shaped bar 148. The wooden beam members may be conveniently secured to the metal bar by means of the nut-bolt assemblies 150, 152 as shown in FIG. 5, with the various nut-bolt assemblies being spaced at preselected distances along the entire length of the bar. The nut-bolt assembly shown in FIG. 5 not only serves as a connector device but also as a stop element for limiting the movement of end fitting 26 in its slidable motion into and out from the cross member.

End fitting 26 is slidably carried within a metal insert 154 locked within the cross member by welding onto bar 148. The purpose in providing the slidable movement between end fitting 26 and the cross member 28 is to accommodate weaving of the freight car side wall during transit, particularly during "humping" operations when the side walls are subjected to considerable outward pulling or bowing stresses. One or both of the end fittings 26 may be slidably related to the cross member. In the case where the end fitting is rigidly carried by the cross member, the slot 156 in the end fitting is eliminated, and the concealed portion of the end fitting is reduced in length.

The outer visable portions of each end fitting 26 are preferably the same, and a single description of one will therefore suffice for the other. The outer end portion of each end fitting is formed as a high strength body 158 having two laterally spaced integrally formed hook portions 160 and 162, each of said hook portions providing a tip area 164 which is adapted to extend downwardly adjacent a vertically extending ledge formed by the internal surface 166 of a rail 22. Hook portions 160 thus extend through spaced openings 140 and in back of the surface 166 to prevent horizontal pull out of the end fittings 126 and the connected cross member 28.

The cross member is prevented from vertical displacement by means of a latch member 168, said latch member being slidably positioned on a slideway 170 formed by an axially extending depression in the end fitting body 158. The rear portions of latch 168 are extended laterally at 174 to slidably seat on the upper spaced portions 176 of body 158, and a hand grip is provided at 180 to effect manual withdrawal of the latch 168 out of an opening 140.

In its illustrated position the latch 168 underlies shoulder-forming surface 182 to prevent vertical displacement of the cross member 28. The latch is held in its illustrated position by means of a compression spring 184 seated in recess 172 so as to act against surface 186 of the latch 168. Rightward movement of the latch is limited by the tubular stop element 188 extending above the upper face of latch 168 and anchored on the wing portions 190 and 192 formed integrally with body 158. Element 188 engages the forward face of hand grip portion 180 to act as a stop element; additionally member 188 maintains latch element 168 in slidable seated position on the surfaces 176 and 170. The formation and arrangement of parts is such that a smooth sliding action of the latch is easily accomplished without tendency to jam in operation.

It will be noted that the extreme leading edge 194 of the latch is angled to form a cam surface engageable with the edge portion 196 formed by an opening 140 during installation of cross member 28. Thus, the cross member may be easily installed by a simple downward movement with hook portions 160 dropping down through openings 140 and the cam surface 194 striking edge 196 to automatically cam the latch out of the way. When the latch 168 is below the level of wall 112 the spring 184 automatically urges the latch to its illustrated position locking the cross member in place. The arrangement is such that the workmen can easily handle a long cross member and install it in desired location on the rail 22 in a minimum period of time and with minimum effort.

The cross member-end fitting assembly is of comparatively low cost, high strength construction. In this connection the member 26 is susceptible to manufacture as a high strength member by low cost forging operations. Similarly the member 168 is of such configuration that it can be formed by low cost forging operation. The end fitting structure is thus jam-free in operation, and the jam-free operation is provided without expensive machining procedures.

Figure 13:
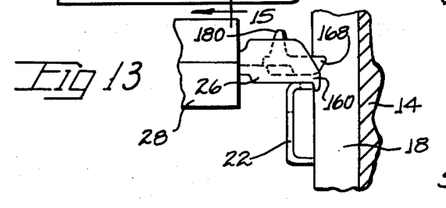
FIG. 13 is an elevational view showing a portion of a cross member of the invention in a position preparatory to being secured in place in a freight car.

FIG. 13 illustrates an advantageous feature of the FIG. 5 arrangement. Thus, as shown in FIG. 13 cross member 28 can be supported for a short time with each of its end fittings resting on the upper wall 112. The cross member can then be shifted horizontally lengthwise of the freight car until it strikes the freight or bulkhead, after which the cross member or its telescoped end fitting can be shifted laterally of the car to drop the hook portions 160 into selected ones of the openings 140. In this manner the cross member can be easily and quickly locked in a position preventing any substantial shifting of the freight. In this connection it will be appreciated that each of the cross members is relatively heavy, and the temporary support offered by rails 22 is of material advantage in enabling the workman to shift the cross member into snug abutment relative to the freight preparatory to dropping the hook portions 160 into the desired openings 140. It should be noted that with the FIG. 13 arrangement both end portions of the cross member can be temporarily supported on the rails 22. Thus the workman is relieved of supporting the cross member adjacent its midpoint, and he can station himself near either end of the cross member for most effectively pushing it against the freight or bulkhead.

The above feature is obtained in part by the relationship between the pillars 18 and rails 22 whereby each rail is spaced from the freight car side wall to form a space for freely accommodating the hook portions 160 and latch portions 168 (in the FIG. 13 position). Also the smooth contour of rail wall 112 is of importance in permitting free adjusting movement of the end fittings along the rail.

Figure 10:
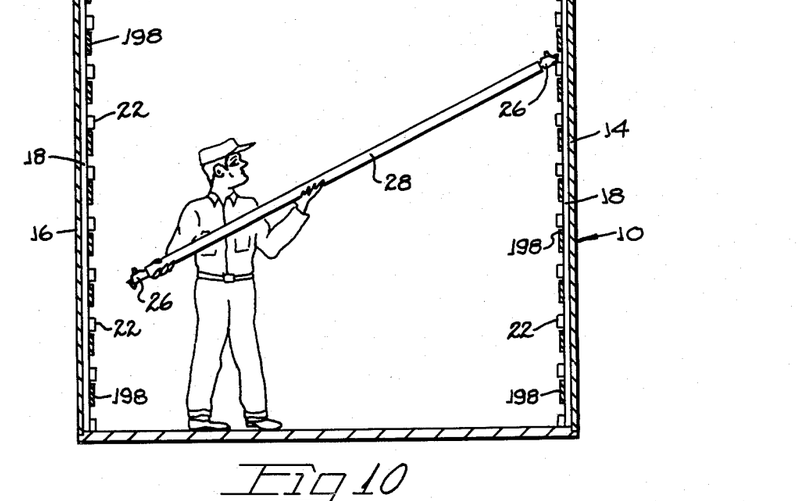
FIG. 10 is a sectional view through a freight car having one embodiment of the invention therein.
Figure 11:
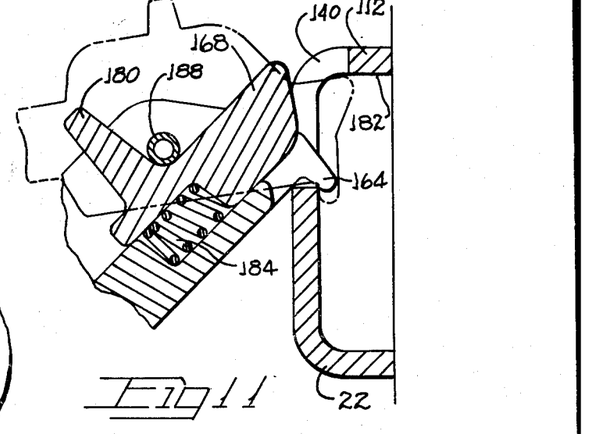
FIG. 11 is an enlarged sectional view of a cross member and rail used in the FIG. 10 embodiment.

A further advantage of the FIG. 5 structure is illustrated in FIGS. 10 and 11. Thus, in FIG. 10 there is shown to approximate scale a freight car 10 having side walls 14 and 16 provided with pillars 18 spaced therealong. Fixedly carried on the pillars at spaced vertical intervals are the rails 22, said rails being similar to the previously mentioned rails except for their fixed connections with the pillars. The spaces between the rails are provided with wooden rub boards 198.

It will be noted that the FIG. 10 freight car is relatively high as compared with the height of the workman. Thus, the cross member 22 cannot be conveniently locked in a desired position across the upper rails in the car except when the rail is first supported at one of its ends as shown in FIG. 10. After the cross member has been moved into a supported position as shown in FIG. 10 the workman can complete the installation of the cross member by climbing up wall 16 and dropping the adjacent end fitting into locked positions on the desired rail 22. In climbing wall 16 the workman merely uses the lowermost rails 22 on wall 16 as steps or ladder rungs.

It will be realized that during the time when the workman is climbing wall 16 it is necessary that end fitting 26 adjacent wall 14 be prevented from becoming detached from the wall 14 rail; otherwise the raised end of the cross member may slip out of the rail and down onto the floor so as to defeat the cross member installation operation. By reference to FIG. 11 it will be seen that the "cut away" character of each rail 22 and the hook-like character of the end fittings 26 permit the cross member to be continuously supported by a rail 22 throughout the time when the workman is climbing wall 16. Of importance also is the fact that the cross member can be initially put in a supported position on wall 14 by merely raising its right end portion and dropping the right most hook-shaped end fitting down onto a desired location on a selected rail. Further, it will be noted that as the left end of the cross member is raised the latch element for the right end fitting gradually moves into a "latched" position beneath ledge 182; as a result the right end fitting is automatically locked by raising of the left fitting. As previously indicated, one or the other of the end fittings is slidably telescopingly carried by the cross member so that the left end of the cross member can be raised above the rails on wall 16 without encountering interference.

During the foregoing description the installation of a cross member in an elevated position (FIGS. 10 and 11) has been described on the basis that the right end fitting would be set onto a selected rail before raising of the cross member left end. However it will be appreciated that the procedure could at the discretion of the workman be reversed, i.e., the workman could raise the left end of the cross member before the right end. With either procedure the cross member can be raised to a locked operative position by a single workman. This is of course a desired advantage over certain prior art arrangements which require two workmen to position a cross member at elevated locations.

Removal and relocation of the FIG. 5 cross member from elevated positions may be effected by a reverse movement of the cross member (as compared with the "installation" movement previously described). Thus, one end of an elevated latched cross member may be unlatched by a manual pull on one of the hand grips 180, followed by a slight raising of the cross member end portion sufficient for tip areas 164 to clear surfaces 166, and a telescoping of the end fitting into the insert 154. The "unlatched" end of the cross member may then be tilted downwardly about the other latched end. During this downward tilting movement the latched end of the cross member moves from the FIG. 5 position to the FIG. 11 phantom line position, and then to the FIG. 11 full line position.

It will be noted that in the FIG. 11 phantom line position the tip area of latch member 168 is just clearing the shoulder-forming surface 182. Clearing of this tip area is made possible in the illustrated embodiment by the clearance 183 between surfaces 182 and 185 (FIG. 5). The clearance may vary with different dimensional factors in different installations, including length of the cross member, dimension of opening 140, contour of tip area 168, and extent to which tip area 168 underlies surface 182 in the latched position. In an illustrative installation having a nine foot crossmember and an "underlying" tip area 168 length of one fourth inch, clearance 183 may be approximately one eighth inch. This clearance has no deleterious effect on the latching action of the cross member end fitting since the load acts primarily downwardly or horizontally on the cross member, rather than upwardly. In addition the one eighth inch clearance is not sufficient to permit any substantial play of the cross member such as would permit undue shift of the cargo.

Figure 12:
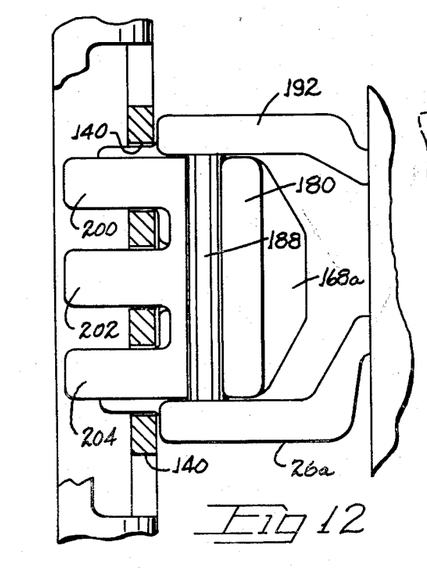
FIG. 12 is a top plan view of an end portion of a cross member constructed according to the invention.

Referring now to FIG. 12, there is shown an end portion of a cross member which may be substituted for the cross member shown in FIG. 5. The FIG. 12 cross member is provided with an end fitting 26a which is provided with a slidable latch member 168a. Member 168a defines three individual latch portions 200, 202 and 204 which are suitably spaced to register with selected openings 140 in rail 22. In this manner the ledge 182 (FIG. 5) is contacted at a plurality of widely spaced points by the latch portions so as to positively prevent the cross member from tilting or wobbling about its longitudinal axis. In many instances the FIG. 5, "single latch portion" structure is sufficient for anchoring of the cross member, but if the freight should be of such character as to impose a substantial "tilting" force onto the cross member then the FIG. 12 structure can be employed. The FIG. 12 structure is similar in general function to the FIG. 5 structure except for the "anti-tilt" feature.

Figure 14:
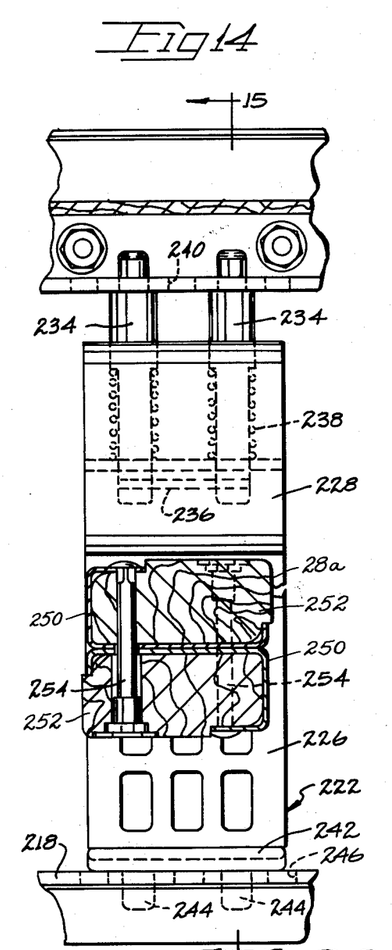
FIG. 14 is an elevational view looking toward the side wall of a highway van having one embodiment of the invention therein.
Figure 15:
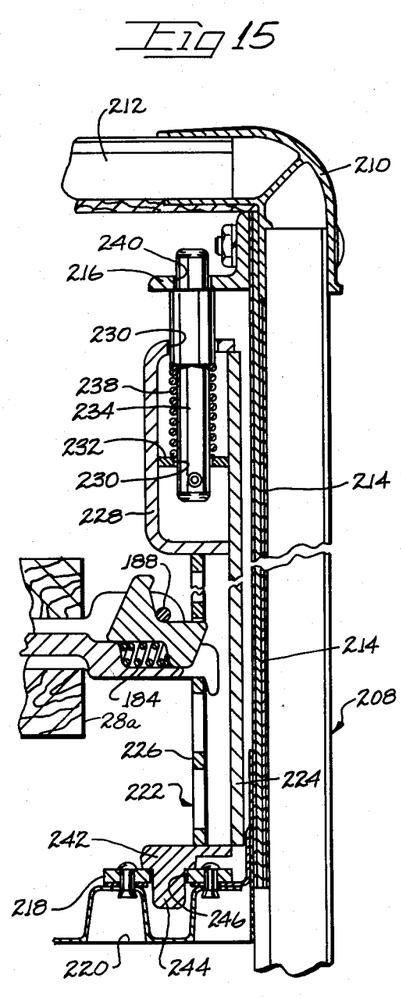
FIG. 15 is a sectional view on line 15—15 in FIG. 14.

Referring now to FIGS. 14 and 15, there is shown a portion of a highway trailer van 208, said van including an upper longitudinal frame member 210 for supporting a roof 212 and a light side wall 214. Wall 214 is of insufficient strength to support rails, cross members and the load in the manner of the heavy freight car side walls 14 and 16; accordingly the cross members and load are supported from a pair of rails 216 and 218 carried on frame member 210 and trailer floor 220 respectively.

When the cross member end fitting is in the FIG. 11 full line position it becomes a simple matter for the workman to lift the cross member to disengage hook portions 164 from channel 22, for relocation or complete removal of the cross member. It will seen that the entire "removal from elevated positions" operation can be performed quickly by a single workman in contrast to conventional constructions wherein two workmen are required.

FIG. 15 shows only one side portion of a trailer, but it will be understood that frame 210 and rails 216, 218 are duplicated along the other trailer side wall, the arrangement being such that each rail 216 and its subjacent rail 218 cooperate to adjustably mount a pillar structure 222. Each pillar structure includes a vertical plate 224 and vertical channel 226 suitably welded or otherwise secured together to define a strong box section. The upper portion of each channel 226 is cut away to accommodate a transverse channel 228. Openings are provided at 230 in channel 228 and internal plate 232 to slidably mount latch pins 234, said latch pins being interconnected by a cross element 236, and said latch pins being urged upwardly by compression springs 238. The arrangement is such that pins 234 are adapted to register with spaced openings 240 in rail 216 for the purpose of holding the upper end of the pillar structure in rigid adjusted position.

The lower end portion of each pillar structure 222 is held in adjusted position by means of a foot structure 242, said foot structure being welded or otherwise secured on the pillar structure and having the spaced pins 244 thereon for entry into selected openings 246 in rail 218.

It will be understood that each of the rails 216 and 218 preferably extends along substantially the entire length of the trailer, and that substantially the entire rail length is provided with evenly spaced openings 240 or 246 so as to permit disposition of a pillar structure at selected points along the trailer length. Positionment of the pillar structure is preferably effected by thrusting the pillar in a slightly upwardly angled direction to place pins 234 in openings 240, continuing the upward thrust to cause pins 244 to clear rail 218, and then allowing the pillar to settle down with pins 244 entering the openings 246.

As can be seen from FIG. 15, each pillar structure is adapted to support one end of a cross member 28a. Each cross member is defined by a pair of C-shaped metal bars 250 and wooden beams 252, the assembly of parts being secured together by nut-bolt means 254. Preferably the bolts are arranged in a staggered relationship along the cross member, i.e. each successive bolt is arranged adjacent a different edge of the cross member. In this manner a comparatively quick, low cost, high strength connection is provided between the individual bars and beams.

The end fittings for cross members 28a are similar to the end fitting shown in FIG. 5, except that latch portion 168a is set to the left of the tips of hook portions 160a because of the character of channel 226. Thus, when the end fitting 26a is being installed into channel 226 it is desirable that hook portions 160a enter into channel openings 140a prior to entry of latch portion 168a; accordingly the latch portion is set back (to the left) to preclude it from interfering with free entry of hook portions 160a into the selected openings 140a.

The FIG. 14 arrangement is advantageous in that it economizes on weight and materials. Thus the arrangement eliminates the need for horizontal rails of the type shown in FIG. 9. Also, the number of pillar structures is held to a minimum, since the pillars are only employed at those locations required to anchor cross members.

From the above explanation it will be appreciated that the disclosed mechanisms are capable of extensive adjustments, and that these adjustments can be effected in a comparatively short period of time so as to materially reduce the time period required for loading and unloading a freight car or other storage device. Additionally the arrangement is such that various different types of cargo can be handled in the same storage device and the entire storage area can be fully utilized, thereby saving considerably on shipping costs. The component structures utilized in the apparatus are all of rigid, high strength design while

We claim:

1. The combination comprising two parallel horizontal rails having openings in their upper and side surfaces defining a vertically extending ledge and a downwardly facing horizontal ledge; a cross member having end fittings extendable through the openings in the rails; said end fittings having hook sections adapted to engage the vertical ledges to prevent horizontal pull out of the cross member from the rails, and having a movable latch projectable into the rail openings to have a surface thereof underlie the horizontal ledge for preventing vertical displacement of the cross member; said latch having a cam surface thereon adapted to coact with a surface of the rail during cross member installation to retract the latch out of an interfering position.

2. An elongated freight-engaging cross member having fittings at each of its ends; at least one of said end fittings including a pair of laterally spaced hook portions extending longitudinally of the cross member for mounting the cross member, and a slideway portion intermediate the hook portions; a movable latch slidably positioned on said slideway portion for preventing vertical displacement of the cross member; and spring means between said one end fitting and said latch urging said latch axially away from the cross member.

3. The combination comprising spaced wall structures, each having openings therein; a cross member extending between said wall structures and having end fittings thereon, at least one of said end fittings having laterally spaced hook portions extending through openings in the wall structures and engaging concealed portions of said wall structures to prevent horizontal pull out of the cross member from said wall structures; the central end area of said one fitting defining an upwardly opening slideway, and the end fitting portions along said slideway extending upwardly to define wing portions; a latch member slidably positioned on said slideway for movement axially away from the cross member into the wall structure openings for preventing vertical displacement of said cross member; a stop element extending between said wing portions in the area immediately above the latch to prevent upward movement of said latch and limit latch movement in directions away from the cross member; a hand grip portion extending upwardly from said latch adjacent the stop element to facilitate manual withdrawal of the latch out of the wall structure openings; and spring means between the said one end fitting and a surface of the latch urging said latch axially away from the cross member.

4. Freight storage means comprising two opposing wall structures, each having a series of openings therealong defining vertical ledges and horizontal ledges; a cross member extending between said wall structures and having end fittings; each of said end fittings having hook portions thereof engaging a vertical ledge to prevent pull out of the cross member from the respective wall structure; and a retractable latch carried by each end fitting and underlying a horizontal ledge to prevent substantial vertical displacement of the cross member with respect to the wall structures; one of the latches having a clearance with respect to its adjacent horizontal ledge sufficient to permit tilting of the cross member for enabling said one latch to be moved out of its position underlying the adjacent horizontal ledge.

5. Freight storage means comprising a channel member having an opening in its web and one flange portion defining a pair of ledges extending at right angles to one another; an elongated freight-bracing member extending generally transverse to the channel member and having an end fitting adjacent thereto; said end fitting including a body portion and a hook portion extending therefrom through the opening into engagement with the web ledge to prevent longitudinal pull out of the freight-bracing member from the channel member; said body portion defining a slideway extending longitudinally of the freight-bracing member; a movable latch structure seated on said slideway; spring means engaged between the body portion and latch structure for urging said structure through the aforementioned opening into a position such that its leading edge portion underlies the flange portion ledge for preventing pull out of the freight-bracing member from the channel member in a direction transverse to the freight-bracing member length; manually operated hand grip means carried by the latch structure for withdrawing the latch structure away from the flange portion ledge to permit transverse movement of the freight-bracing member to an unlatched position; the leading edge of the latch structure extending beyond the hook portion under the influence of the spring means, and said leading edge defining a cam surface extending angularly to the longitudinal axis of the freight-bracing member, whereby the freight-bracing member may be moved to a latched position by movement thereof parallel with the channel member web, with the cam surface engaging said one flange portion to automatically retract the latch structure for permitting entry of the hook portion through the opening into engagement with the web ledge; the leading edge portion of the latch structure being spaced from said one flange portion in the latched position of the end fitting to define a clearance for enabling the freight-bracing member to be tilted about the juncture of the hook portion and channel member opening so as to carry the latch structure out of registry with the flange portion.

6. In a freight storage area defined in part by two opposed wall structures; the combination comprising a series of horizontal rails of channel cross section located at vertically spaced locations on each wall structure, with the rail web portions extending vertically and with the rail flanges extending away from the storage area; each of the rails having a series of regularly spaced slots formed in connected portions of the rail web portion and the upper rail flange; elongated freight-bracing cross members, each adapted to take a horizontal position extending between opposed ones of the rails; each cross member having a fitting at its ends, at least one of the fittings for each cross member being slidably connected with its cross member for movement in a longitudinal direction; each end fitting comprising a body portion defining a lower horizontal wall and two wing-like side walls extending upwardly therefrom; the space between said wing-like side walls constituting a slideway; the terminal portions of the wing-like walls located longitudinally away from the cross member being hook-shaped so that the defined hook portions can enter into selected ones of the rail slots and take positions within a rail to prevent horizontal straightline movement of the end fittings; a movable latch structure slidably seated on each of the aforementioned slideways for movement longitudinally of the cross member; spring means urging each latch structure away from its cross member; each latch structure having a terminal end portion arranged to underlie a portion of a rail upper flange in the spring-urged position thereof to prevent substantial vertical movement of the cross member; the terminal end portion of each latch structure being adapted to be spaced a clearance distance below the cooperating rail upper flange so as to permit the cross member to tilt about the respective point of connection between the end fitting hook portions and rail web portion; the terminal end portion of each latch structure being adapted to underlie a predetermined area of the rail upper flange such that downward tilting of the cross member about the connection between the rail and aforementioned hook portions causes the latch structure and end fitting to be freed for separation from the rail.

(References on following page)

References Cited in the file of this patent

UNITED STATES PATENTS

| | | |
|---|---|---|
| 1,473,817 | Gorsline | Nov. 13, 1923 |
| 2,091,869 | McCurdy | Aug. 31, 1937 |
| 2,354,861 | Hermann | Aug. 1, 1944 |
| 2,519,846 | Nampa | Aug. 22, 1950 |
| 2,546,929 | Nampa | Mar. 27, 1951 |
| 2,575,326 | Anderson | Nov. 20, 1951 |
| 2,616,375 | Nampa | Nov. 4, 1952 |
| 2,747,520 | Brown et al. | May 29, 1956 |
| 2,769,404 | Dietrichson | Nov. 6, 1956 |
| 2,808,788 | Stough | Oct. 8, 1957 |
| 2,834,304 | Chapman et al. | May 13, 1958 |
| 2,873,695 | Tobin | Feb. 17, 1959 |
| 2,900,925 | Dunlap | Aug. 25, 1959 |
| 2,919,662 | Tobin | Jan. 5, 1960 |
| 2,963,992 | Schroeder | Dec. 13, 1960 |